(12) United States Patent
Poulin et al.

(10) Patent No.: US 6,855,089 B2
(45) Date of Patent: *Feb. 15, 2005

(54) REDUCED TWIST CARRIER

(75) Inventors: Martin Poulin, Mont St-Hilaire (CA); Alain Lewis, Brossard (CA); Robert Gautier, Longueuil (CA); Lazar Mitrovic, Longueuil (CA)

(73) Assignee: Pratt & Whitney Canada Corp., Lonqueuil ( * ) Notice: Subject to any disclaimer, the term of this patent is extended or adjusted under 35 U.S.C. 154(b) by 33 days.

This patent is subject to a terminal disclaimer.

(21) Appl. No.: 10/318,220

(22) Filed: Dec. 13, 2002

(65) Prior Publication Data

US 2003/0162630 A1 Aug. 28, 2003

Related U.S. Application Data

(63) Continuation-in-part of application No. 10/017,152, filed on Dec. 14, 2001, now Pat. No. 6,663,530.

(51) Int. Cl.⁷ ............................................... H16H 57/08
(52) U.S. Cl. ...................................................... 475/331
(58) Field of Search ............................... 475/331, 334, 475/346, 901

(56) References Cited

U.S. PATENT DOCUMENTS

| | | | |
|---|---|---|---|
| 3,527,121 A | * 9/1970 | Moore | 475/331 X |
| 3,842,481 A | * 10/1974 | Laing | 29/434 |
| 3,939,736 A | * 2/1976 | Morin | 475/331 X |
| 4,129,050 A | * 12/1978 | Akashi et al. | 475/331 X |
| 4,282,776 A | 8/1981 | Eller | |
| 4,793,214 A | * 12/1988 | Nurnberger et al. | 475/331 |
| 4,983,152 A | * 1/1991 | Kimberlin et al. | 475/331 |
| 5,136,197 A | * 8/1992 | Hallett | 310/83 |
| 5,382,203 A | * 1/1995 | Bellman et al. | 475/331 |
| 5,470,286 A | * 11/1995 | Fan | 475/331 |
| 5,649,254 A | * 7/1997 | Mori et al. | 396/411 |
| 6,148,605 A | 11/2000 | Lardellier | |
| 6,422,971 B1 | * 7/2002 | Katou et al. | 475/331 |

FOREIGN PATENT DOCUMENTS

| | | | | |
|---|---|---|---|---|
| EP | 271416 | * | 6/1988 | 475/331 |
| EP | 0 618 383 A1 | | 10/1994 | |
| EP | 0 989 316 A1 | | 3/2000 | |
| GB | 725364 | | 3/1955 | |
| GB | 1 420 965 | | 1/1976 | |
| JP | 358156773 | * | 9/1983 | 475/331 |

* cited by examiner

Primary Examiner—Ha Ho
(74) Attorney, Agent, or Firm—Ogilvy Renault (57) ABSTRACT

An epicyclic gear train includes a sun gear rotatable about a central axis, a concentric outer ring gear, and a plurality of gears mechanically intermediate the sun gear and the ring gear, and which are in meshing engagement therewith. An epicyclic carrier assembly comprises a gear support member and a coupling adapter. The gear support member is adapted to rotatably support the plurality of gears on axles between first and second axle ends. The gear support member has at least a first connecting member. The coupling adapter is disposed concentrically with the gear support member and has a second connecting member. The second connecting member is engaged with the first connecting member to structurally join the coupling adapter and the gear support member. The first and second connecting members are mounted to one another in a plane between the first and second axle ends.

11 Claims, 10 Drawing Sheets

FIG_1

FIG_4b

FIG_5

REDUCED TWIST CARRIER

CROSS-REFERENCE TO RELATED APPLICATIONS

This application is a continuation-in-part of U.S. patent application Ser. No. 10/017,152, filed Dec. 14, 2001 which issued Dec. 16, 2003 as U.S. Pat. No. 6,663,530.

TECHNICAL FIELD

The present invention relates to epicyclic gearboxes, and more particularly, to a gear carrier in an epicyclic gearbox.

BACKGROUND OF THE INVENTION

Epicyclic gearboxes are frequently used in gas turbine engines for their compact designs and efficient high gear reduction capabilities. Planetary and star gear trains are well known, and are generally comprised of three gear train elements: a central sun gear, an outer ring gear with internal gear teeth, and a plurality of planet gears supported by a planet carrier between and in meshing engagement with both the sun gear and the ring gear. All three gear train elements share a common longitudinal central axis, about which at least two of them rotate. An advantage of epicyclic gear trains is their versatility. A rotary input can be connected to any one of the three elements. Holding one of the remaining two elements stationary with respect to the other two, permits the third to serve as an output.

In gas turbine engine applications, where a speed reduction transmission is required, the central sun gear generally provides rotary input from the powerplant. In planetary gear trains, the outer ring gear is generally held stationary and the planet gear carrier therefore rotates in the same direction as the sun gear and provides torque output at a reduced rotational speed. In star gear trains, the gear carrier is held stationary and the output shaft is driven by the ring gear in a direction opposite that of the sun gear.

However, certain shortcomings do exist with epicyclic drive trains. For example, as with many mechanical elements that transfer torque, a small but nevertheless significant amount of torsional deflection commonly occurs due to the elasticity of the material of the carrier, as a result of twist between upstream and downstream plates of the gear carrier, when the gear train is under load. The gear carrier twists around its central axis, causing the individual axis of rotation of the gears to lose parallelism with the central axis, of the gear carrier. This torsional deflection results in misalignment at gear train journal bearings and at the gear teeth mesh, which leads to efficiency losses and reduced life of the parts. Additionally, increased oil flow is required to the journal bearings to compensate for the misalignments caused by torsional deflections of the gear carrier plates.

Attempts to address this problem of planetary carrier torsional deflection are known. U.S. Pat. No. 5,466,198 issued Nov. 14, 1995 to McKibbin et al, for example, clearly sets out the problem and proposes a planetary gear train drive system which isolates the planetary carrier from torsional deflections. A torque frame or torque transfer structure is connected to a rotating load, such as a bladed propulsor. Pivotal joints, circumferentially disposed with respect to the carrier, each pivotable about a radial axis, connect axially extending arms of a torque frame to the planetary carrier. The pivotal joints, which are vital to the invention of McKibbin et al, permit the planetary carrier to be isolated from torsional deflections. While McKibbin et al do provide a device that eliminates planetary carrier torsional deflections, the planetary carrier system disclosed is of significant complexity. Both a low number of parts and low weight are characteristics vital in aircraft applications. Also, added parts, especially involving pivotable joints, increases the possibility of reliability problems.

Therefore, there remains a need for a simple, compact, device capable of transferring torque while eliminating twist within a planetary carrier.

SUMMARY OF THE INVENTION

It is an object of the present invention to provide an improved epicyclic gear train.

It is an object of the present invention to provide a torque transfer device for use in a epicyclic gear train.

It is another object of the present invention to provide a gear carrier capable of torque transfer while incurring minimal twist between upstream and downstream plates of a gear carrier.

Therefore, in accordance with one aspect of the present invention, there is provided a torque transfer assembly adapted for use in an epicyclic gear train, the gear train including a sun gear rotatable about an axially extending central axis, a concentric outer ring gear, and a plurality of gears mechanically intermediate said sun gear and said ring gear and in meshing engagement therewith, said plurality of gears being adapted for receiving torque input from said sun gear, said torque transfer assembly comprising: an epicyclic carrier, rotatable about said axially extending central axis and adapted to rotatably support said plurality of gears on a plurality of axles between first and second axle ends, said first and second axle ends defining first and second planes respectively, said plurality of axles being parallel to said central axis and said first and second planes being perpendicular to said central axis, said plurality of gears being circumferentially located on the epicyclic carrier about said central axis, said epicyclic carrier having a first connecting member extending therefrom; and a torque transfer coupling adapter, disposed concentrically with said epicyclic carrier and rotatable therewith, said torque transfer coupling adapter having a central torque output element and a second connecting member extending therefrom, said second connecting member being adapted to be engaged with said first connecting member to structurally join said coupling adapter and said epicyclic carrier, said first and second connecting members being structurally joined together between said first and second planes.

There is also provided, in accordance with a second aspect of the present invention, an epicyclic carrier assembly adapted for use in an epicyclic gear train, said gear train including a sun gear rotatable about a central axis, a concentric outer ring gear, and a plurality of gears circumferentially spaced relative to, and mechanically intermediate of, said sun gear and said ring gear and in meshing engagement therewith, said plurality of gears being adapted for receiving torque input from said sun gear, said planetary carrier assembly comprising: a split gear carrier, comprising a first half and a second half for rotatably supporting respective first and second ends of a plurality of axles of said plurality of gears, said plurality of axles being parallel to said central axis, said plurality of gears being circumferentially located about said central axis and axially disposed between said first and second halves of said split gear carrier, each of said first and second halves having a corresponding first attachment member; and a carrier support torque frame disposed concentrically with said central axis and axially located between said first half and said second half of said split gear carrier, said carrier support torque frame having an annular mounting flange adapted for fixed engagement with an outer housing and comprising a second attachment member, said second attachment member being mounted to said first attachment members to structurally connect said first and second halves of said split gear carrier to said carrier support torque frame, said first and second attachment members being mounted to one another in a plane between said first and second ends of said plurality of axles of said plurality of gears.

There is further provided, in accordance with another aspect of the present invention, an epicyclic carrier assembly adapted for use in an epicyclic gear train, said epicyclic gear train including a sun gear rotatable about a central axis, a concentric outer ring gear, and a plurality of gears circumferentially spaced relative to, and mechanically intermediate of, said sun gear and said ring gear and in meshing engagement therewith, said plurality of gears being adapted for receiving torque input from said sun gear, said epicyclic carrier assembly comprising: a gear support member, concentric with said central axis, and adapted to rotatably support said plurality of gears on a plurality of axles between first and second axle ends, said plurality of axles being parallel to said central axis, said plurality of gears being circumferentially located on said epicyclic carrier about said central axis, said gear support member having at least a first connecting member; and a coupling adapter disposed concentrically with said gear support member, said coupling adapter having and a second connecting member, said second connecting member being engaged with said first connecting member to structurally join said coupling adapter and said gear support member, said first and second connecting members being mounted to one another in a plane between said first and second axle ends.

BRIEF DESCRIPTION OF THE DRAWINGS

Further features and advantages of the present invention will become apparent from the following detailed description, taken in combination with the appended drawings, in which:

FIG. 4b shows a front elevation view of the planetary carrier of FIG. 4a.

DETAILED DESCRIPTION OF THE PREFERRED EMBODIMENT

Figure 1:
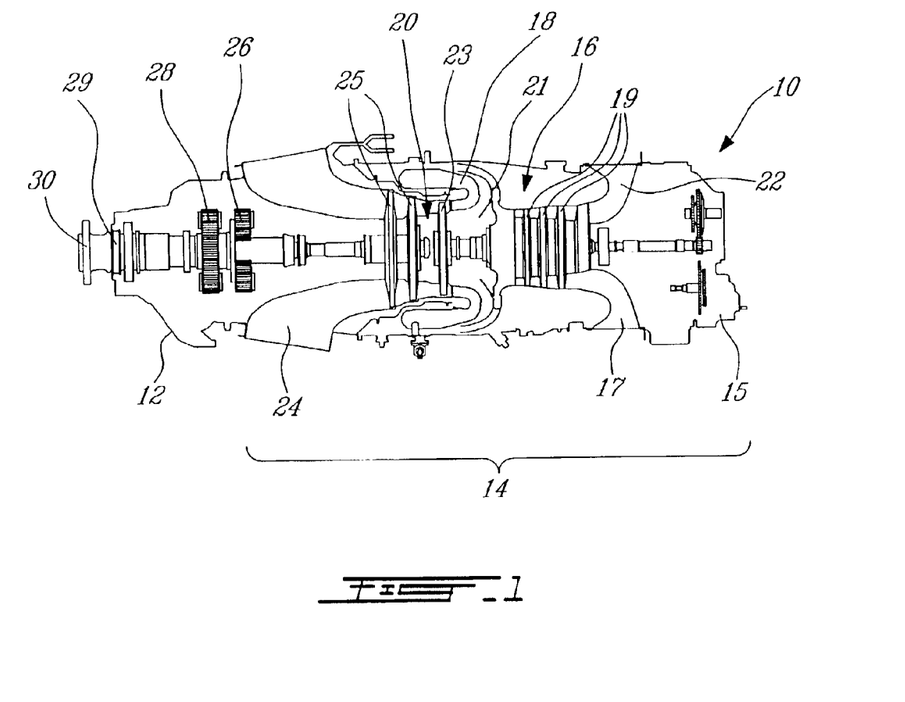
FIG. 1 shows a schematic view of a gas turbine engine having a multi-stage planetary gearbox incorporating the present invention.

Referring to FIG. 1, a turboprop gas turbine engine 10 generally having a power plant 14 and a reduction gearbox 12. The engine power plant 14 includes a compressor section 16, combustion chamber 18, and a turbine section 20. Air inlets 22 permit air to be drawn into the gas generator and, following power withdrawal by the turbine section, exhaust ducts 24 provide an engine exhaust gas outlet.

The operation of such a gas turbine engine is well known, and occurs generally as follows by means of example only. Air enters the engine through the inlet 17 and is compressed by the compressor section 16, in this case comprising axial flow compressors 19 and a centrifugal compressor 21. The compressed air is then fed to the combustion chamber 18 where it is mixed with fuel and ignited. The hot gas then expands through the turbine section 20, comprised of a compressor turbine 23 which drives the compressor 18 and the accessories through accessory gearbox 15, and the power turbine section 25, which is mechanically independent from the compressor turbine 23, drives the propeller shaft 29 by means of the planetary reduction gearbox 12. Planetary or epicyclic gearboxes are well known in turboprop applications, and generally comprise a sun gear, a ring gear, and at least two planet gears supported by a planetary carrier, all of which are described in further detail below. The hot gas is then discharged to the atmosphere through exhaust ducts 24.

In the exemplary embodiment, the planetary reduction gearbox 12 includes a first reduction stage 26 and a second reduction stage 28 which drive a propeller (not shown), fastened to propeller flange 30, through propeller shaft 29.

Figure 2:
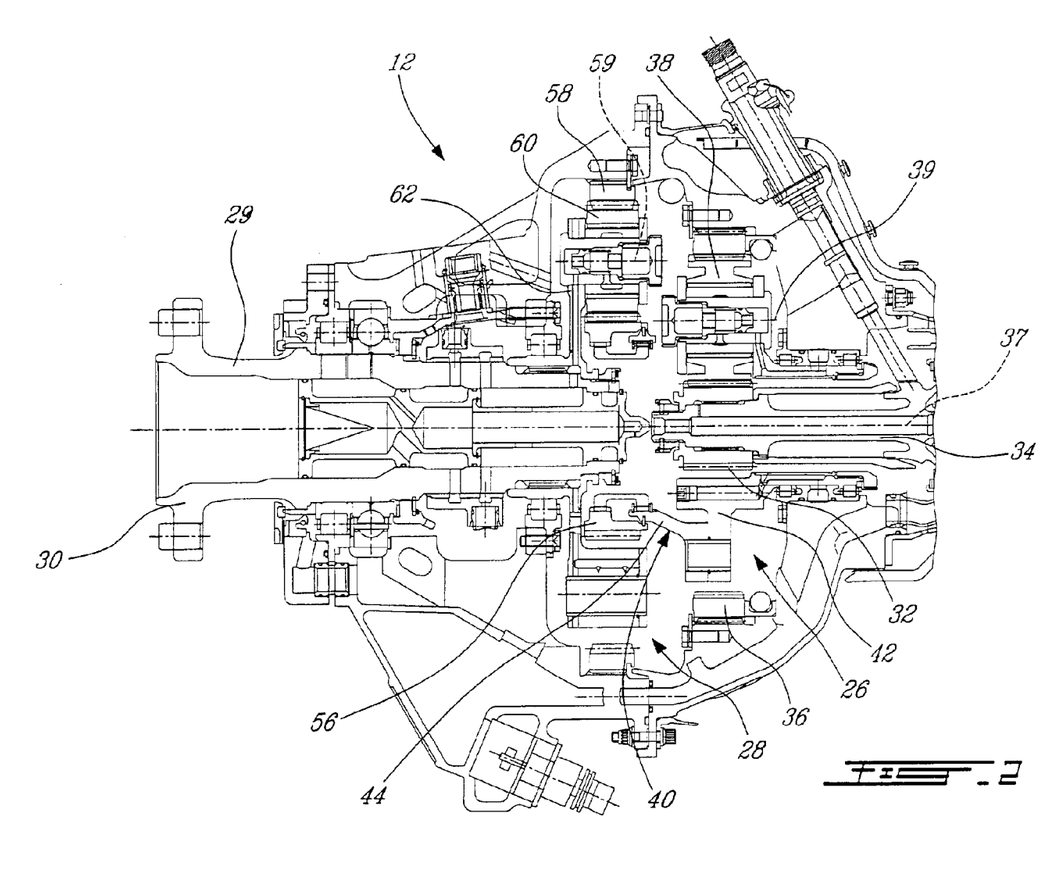
FIG. 2 shows a cross-sectional detail view of the planetary gearbox in FIG. 1.
Figure 3:
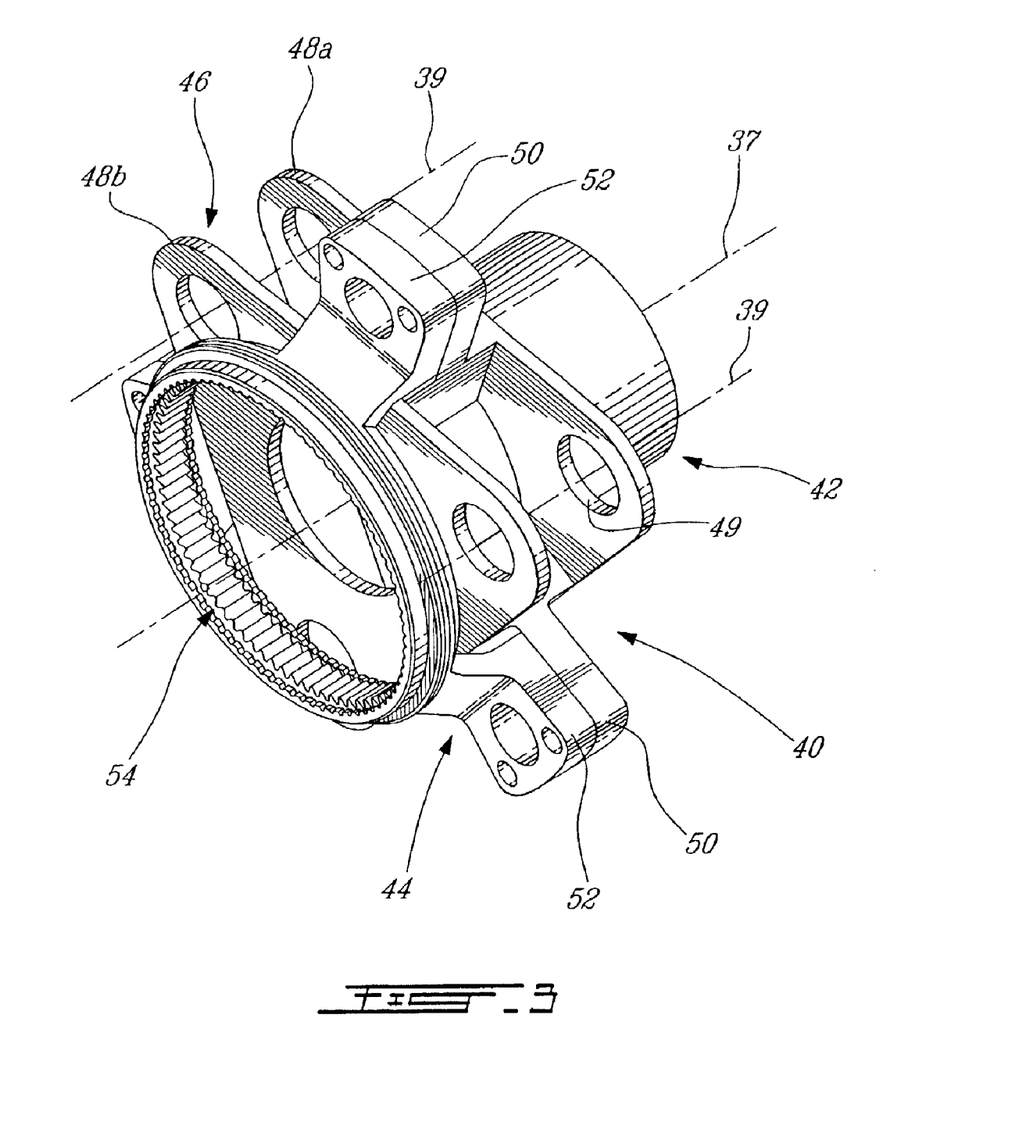
FIG. 3 shows a perspective view of the torque transfer device according to the present invention.
Figure 4A:
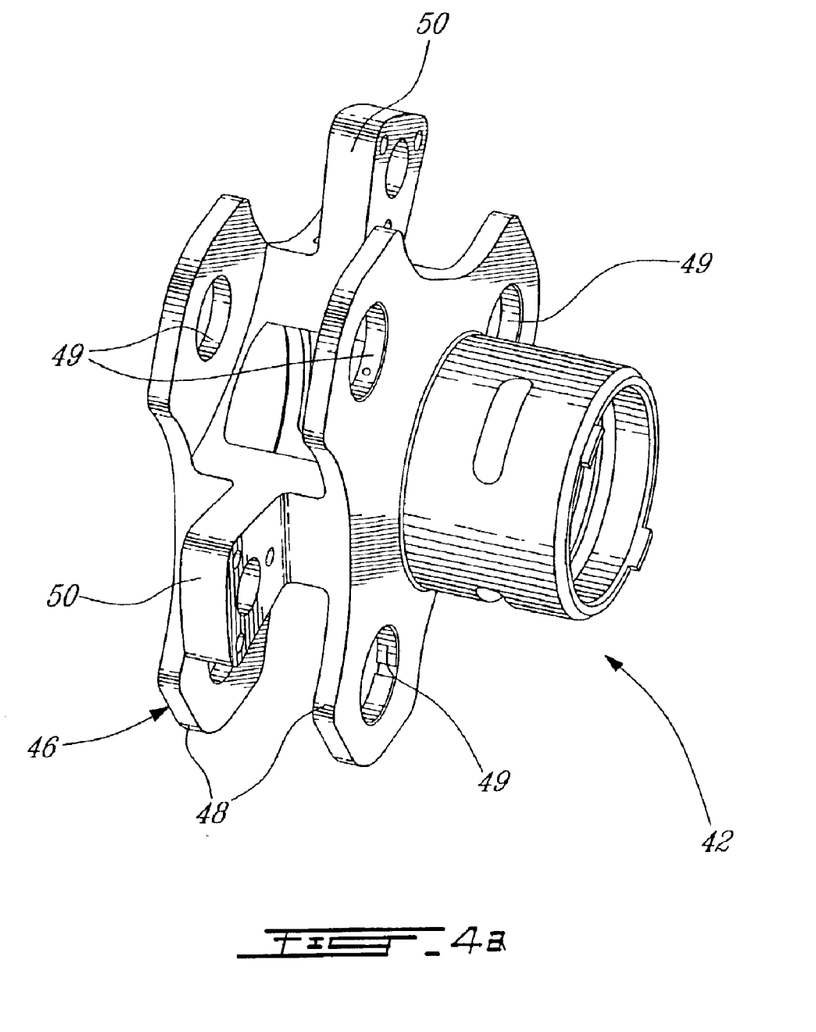
FIG. 4a shows a perspective view of a planetary carrier for use in the torque transfer device of FIG. 3.
Figure 4B:
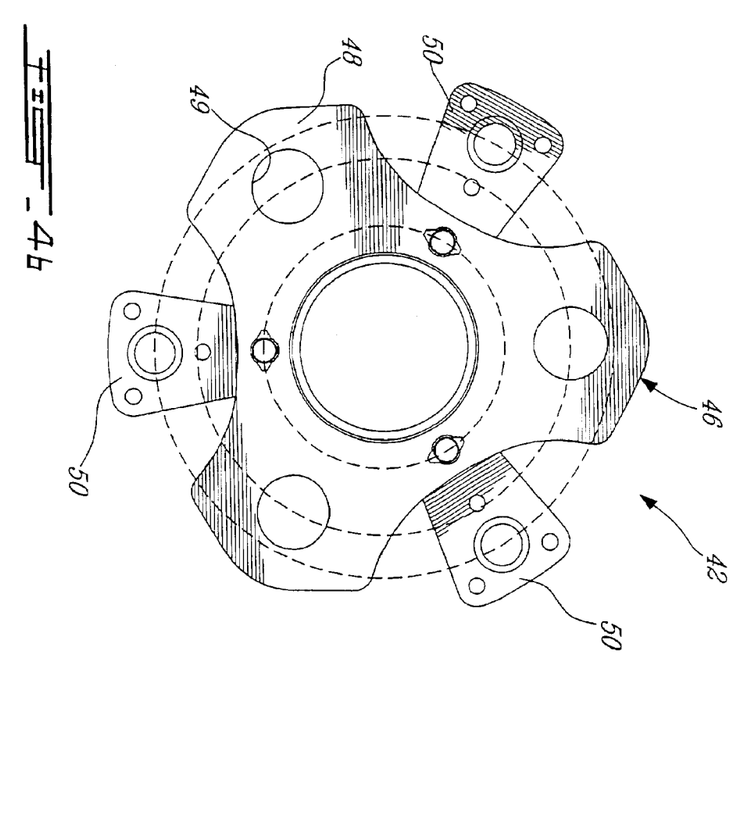
Figure 5:
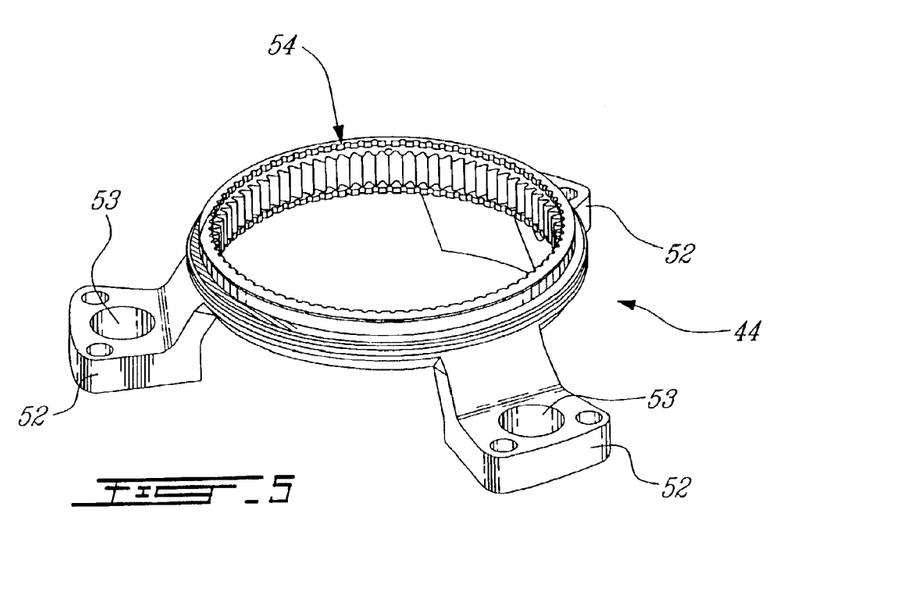
FIG. 5 shows a perspective view of the coupling adapter element of the torque transfer device of FIG. 3.
Figure 6:
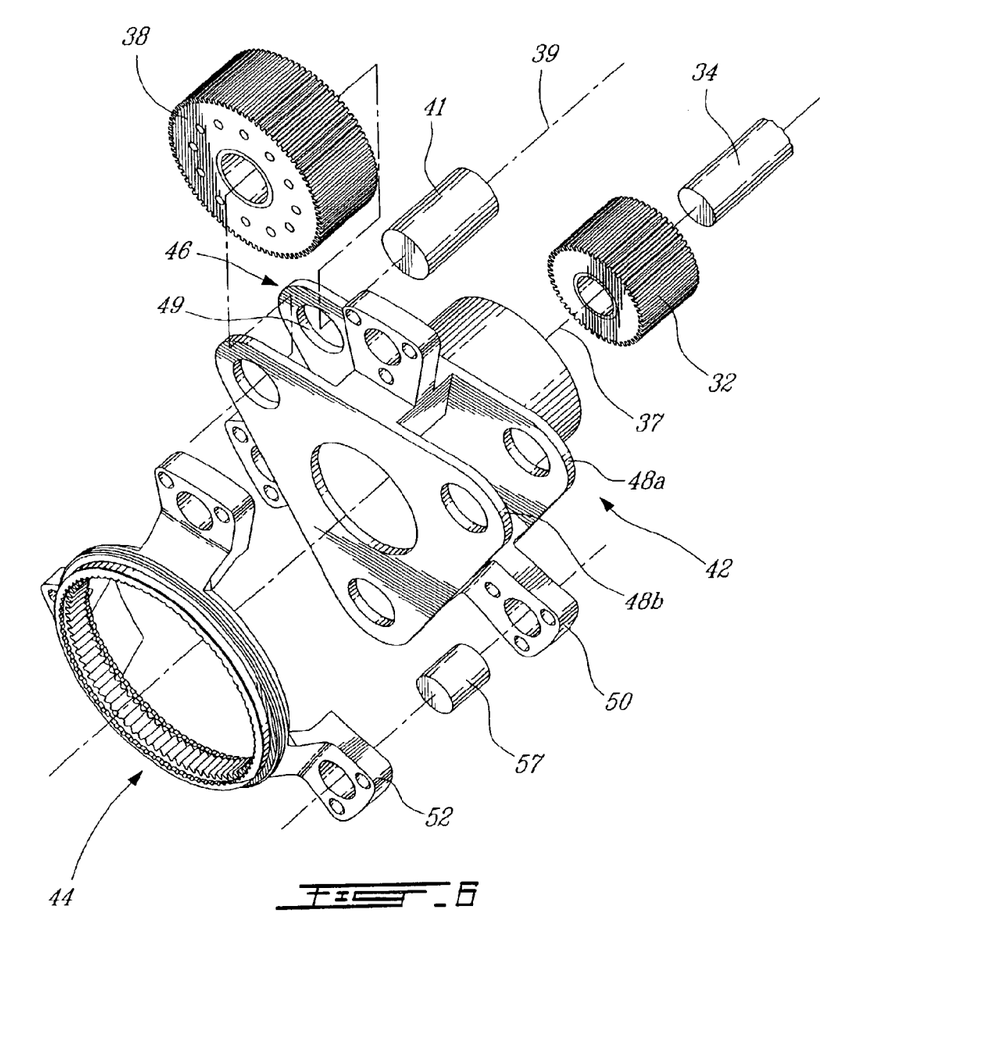
FIG. 6 shows a perspective exploded view of the torque transfer assembly of the present invention.

Referring now to FIG. 2, the reduction gearbox 12 will now be described in more detail. The first reduction stage 26 receives input from the power plant through power turbine output shaft 34 which drives the first stage sun gear 32. The first stage outer ring gear 36 is held stationary within the gearbox casing, and a plurality of planet gears 38 are supported within ring gear 36 by a torque transfer planetary carrier assembly 40, comprised of a first stage planetary carrier 42 and coupling adapter 44. Each planet gear 38 is rotatably mounted in the planetary carrier 42 about an axis 39, as describe further below, and is in meshing engagement with both the sun gear 32 and the outer ring gear 36. The drive shaft 34, sun gear 32, ring gear 36, and planetary carrier 42 are all concentric about, and both the sun gear 32 and planetary carrier 42 are adapted to rotate about, a central axis 37. Each planet gear 38 has its own individual axis of rotation 39, about which each rotates, and are thereby adapted to rotate the planetary carrier 42 about the central axis 37 when driven by shaft 34 through sun gear 32.

The coupling adapter 44 is fastened to, and is therefore adapted to rotate with, the first stage carrier 42 and serves to transfer torque to the second reduction stage 28 of the gearbox as described below. The second stage 28 operates substantially as per the first stage described above, with certain modifications which will be apparent to those skilled in the art, and thus is only described briefly here. The second stage 28 similarly comprises a central second stage sun gear 56 supported within the adapter 44, which is in meshing engagement with a plurality of second stage planet gears 60, which rotate within a stationary second stage outer ring gear 58. The revolving second stage planet gears 60 rotate a second stage planetary carrier 62 which provides output torque to the propeller shaft 29. The second stage sun gear 56 and planetary carrier 62 also rotate about the central axis 37 of the reduction gearbox, and second stage planet gears 60 rotate about their individual axes of rotation 59.

Referring now to FIGS. 3, 4a, 4b, 5 and 6, the torque transfer planetary carrier assembly 40 is generally comprised of the first stage planetary carrier 42 and the coupling adapter 44. The planet gears 38 are each rotatably mounted in the planetary carrier 42 on axles 41 between planet gear brackets 46 defined in two radially extending carrier plates 48a and 48b, perpendicular to central axis 37 and having axle openings 49 therein. The carrier plates comprise an upstream plate 48a and a downstream plate 48b, preferably integrally joined to one another. The planet gear axle openings 49 and the individual axes of rotation 39 are preferably radially an circumferentially equidistantly spaced about central axis 37. Therefore, in a preferred embodiment having three planet gears 38, the individual axes of rotation 39 are spaced 120° apart around central axis 37.

A plurality of mounting pads 50 extending from the planetary carrier 42 preferably intermediate each planet gear individual axis of rotation 39. The mounting pads 50 are preferably axially located between the upstream and downstream plates, 48a and 48b respectively, of the planetary carrier 40. The coupling adapter 44 has an equal number of legs 52 extending therefrom and adapted to correspond to and be mated with the mounting pads 50 of the carrier 42. Mating holes 53 are provided for connection, and the two elements are preferably mounted together using press fit pins 57 and a threaded nut, though any other connection means is possible. In the exemplary embodiment, the coupling adapter 44 also comprises a first stage output spline 54 having internal gear teeth 55 adapted to mesh with and transfer torque to another splined component, which in this case, as shown in FIG. 2, is a second stage sun gear 56. In a single stage planetary gearbox, this splined component receiving torque output can be almost any output shaft, such as, for example, a propeller shaft.

In use, drive shaft 34 rotates sun gear 32 to drive planet gears 38. As planet gears 38 rotate within stationary ring gear 36, the planetary carrier 42 is driven via a load transfer through the planet axles 41 to plates 48a and 48b. Pins 57 pass the load from carrier pads 50 to adapter legs 52 to rotatingly drive the coupling adapter 42 at a reduced speed relative to shaft input drive 34. Further speed reduction is achieved through the second reduction stage 28.

The configuration of the link between the carrier and the coupling adapter is such that no substantially relative twist between the upstream and downstream plates 48a and 48b of the planetary carrier occurs. Therefore, no torsional deflection of the planetary carrier occurs, as the torque input is transferred directly to the adapter 44 by the pads on carrier 42. Thus, a differential torsional load across the planet gear axles 41, is, avoided. The location of the interface between the pads 50 of the carrier 42 and the legs 52 of the adapter 44, intermediate the ends of axles 41 of the planet gears 38, further assists in removing differentially torque loading across the gear axles, and therefore twist in the planetary carrier 42, thereby improving gear alignment.

Turning now to FIGS. 7–10, a second aspect of the present invention is disclosed. This aspect is particularly directed to star gear sets, in which the gear carrier is stationary and the ring and sun gears rotate. Such star gear systems, like that disclosed below, are particularly beneficial for use in low transmission ratio scenarios where the use of planetary gears is not as effective or perhaps not even possible. One such examples is the geared turbofan engine depicted in FIG. 7. A geared turbofan engine generally features a gear set between the fan and the low pressure turbine, which acts as a speed reducer enabling both elements to run at their respective optimal speed, thereby improving the efficiency of the engine. Considering the high power and low transmission ratio requirements, a single stage star epicyclic gear is most suitable.

Figure 7:
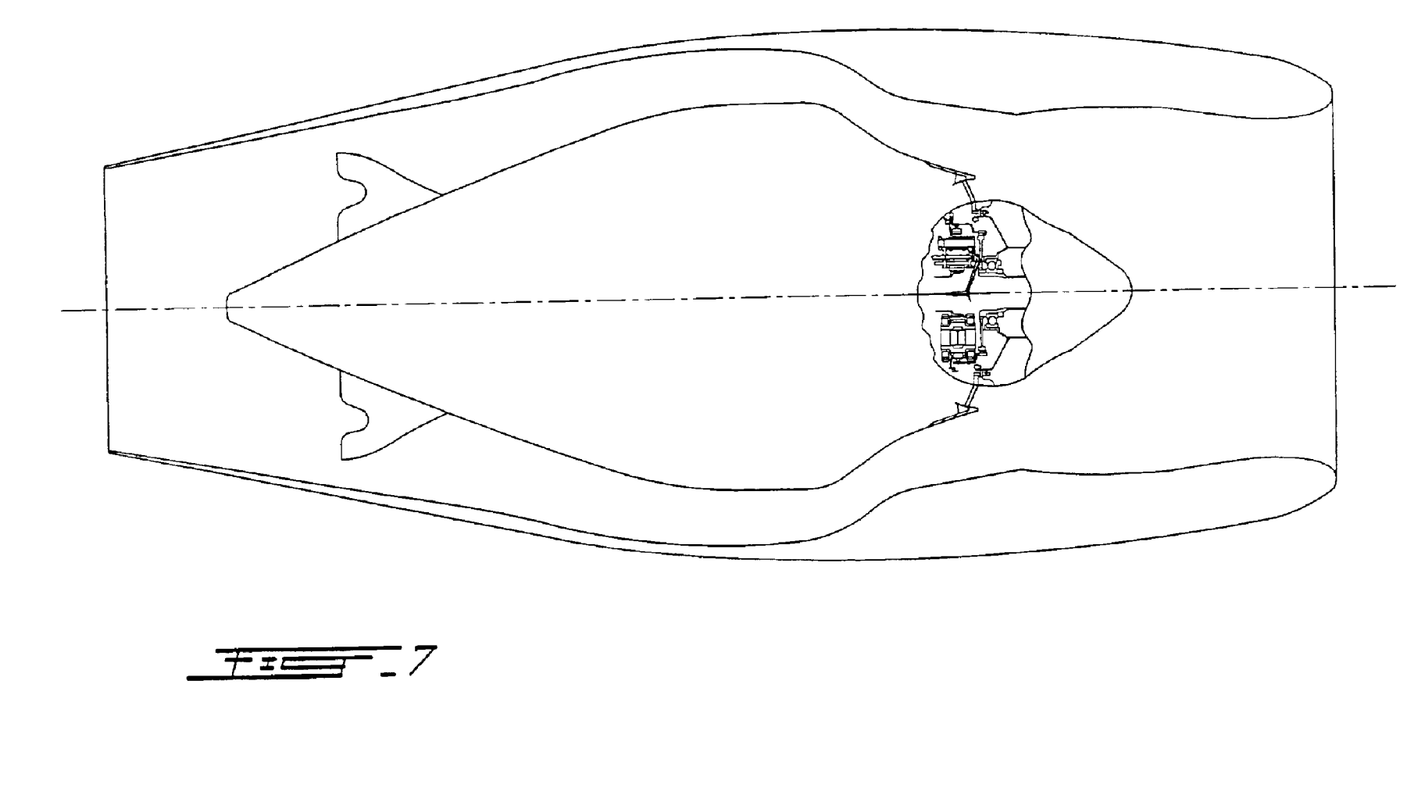
FIG. 7 shows a partial cross-sectional view of a turbofan engine incorporating an epicyclic gear set according to a second aspect of the present invention.
Figure 8:
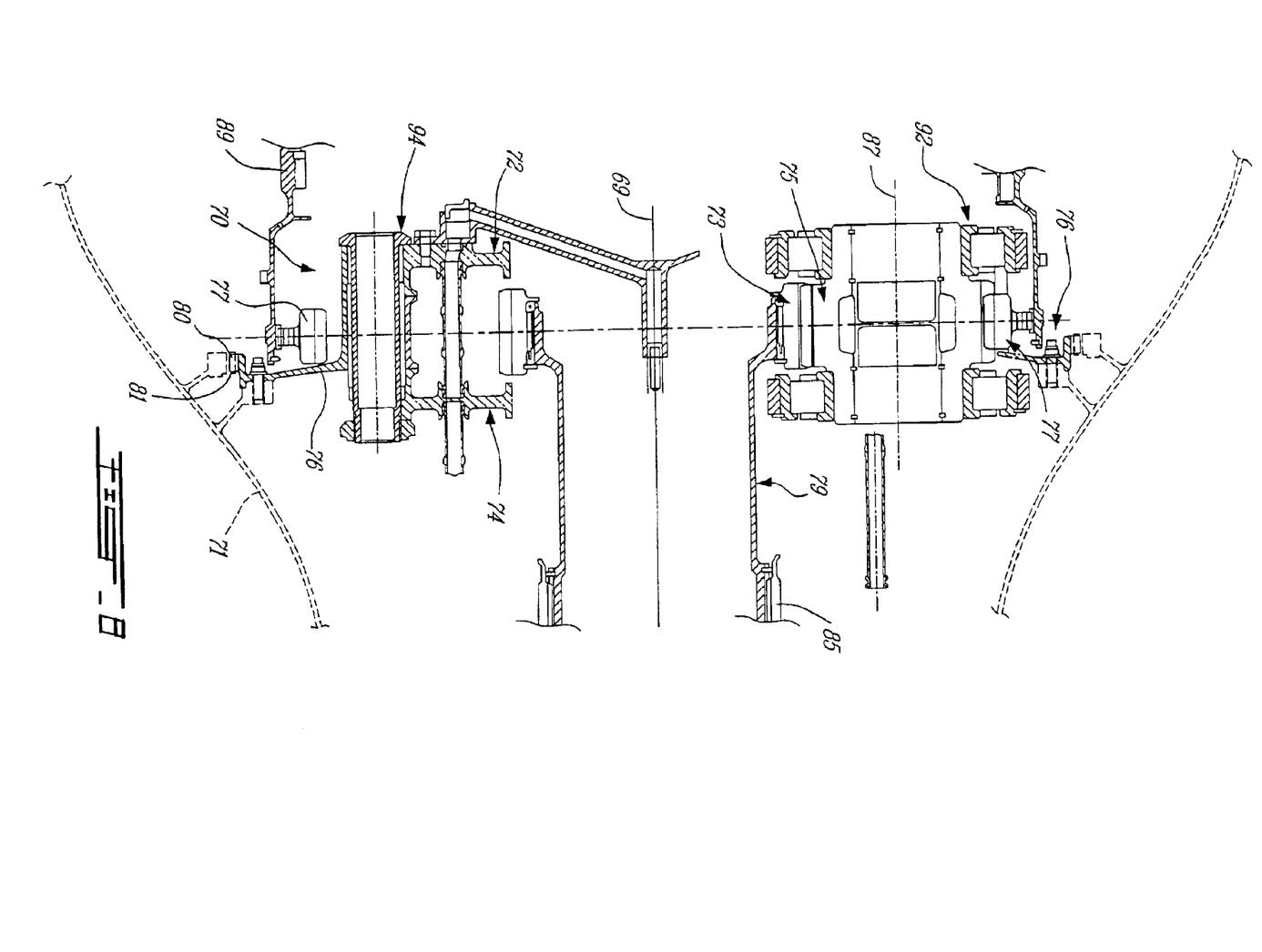
FIG. 8 shows an enlarged cross-sectional view of the embodiment of FIG. 7.

Referring to FIG. 8, in the embodiment of FIGS. 7 to 10 a star carrier assembly 70 substantially reduces torsional deflection in the star carrier, while further significantly reducing the overall weight of the assembly. The star carrier assembly 70 includes a split star gear carrier, having a first half 72 and a second half 74 respectively providing downstream and upstream support for the integral star gear axles, and a central carrier support torque frame 76. The central carrier support torque frame 76 is concentrically disposed with the split carrier halves 72 and 74, and is axially sandwiched therebetween. Unlike the first embodiment, the star carrier assembly 70 does not rotate, but instead is fixed within the outer gearbox housing 71 via splines 80 on a radially outer flange of the carrier support torque frame 76 which mate with inner splines 81 on an outer gearbox casing 71, while an outer ring gear 77 is free to rotate. A central sun gear 73 is driven by output shaft 85 via sun gear coupling 79, and rotates about a longitudinally extending central axis 69. The plurality of circumferentially spaced star gears 75 is radially intermediate the sun gear 73 and the outer concentric ring gear 77 and are in meshing engagement therewith. As the carrier assembly 70 is fixed relative to the outer housing 71, and the star gears 75 rotate about their individual axes 87 when driven by the central sun gear 73, the rotating outer ring gear 77 thereby provides torque output to either a gearbox output shaft or a subsequent stage of a gear train, via a ring gear coupling 89 fixed to the ring gear 77.

Figure 9:
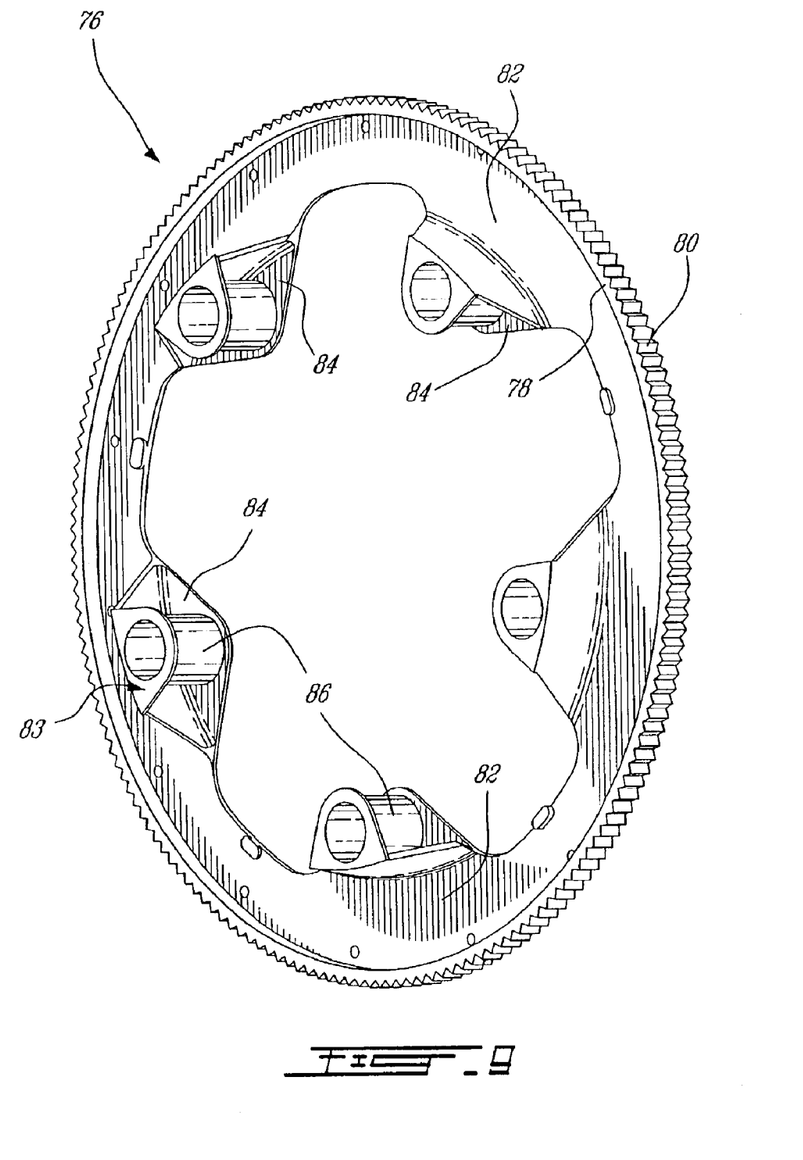
FIG. 9 shows a perspective view of the annular carrier support flange of FIG. 8.

Referring to FIG. 9, the central carrier support torque frame 76 comprises an outer flange 78 having a spline 80 on the outer diameter of the flange 78, for engagement with the corresponding spline 81 within the outer gearbox housing 71. The carrier support torque frame 76 is thereby fixed in place within the outer housing 71, and provided with a mounting arrangement that reacts against torque transmitted through the star gears 75. The carrier support torque frame 76 extends radially inwards from the outer flange 78 and comprises spoke-like webs 82, which are circumferentially spaced and extend between the spaces where each star gear 75 is disposed. Attachment boss members 84 are integrally formed with the spoke-like webs 82, and are preferably press fitted with sleeve dowels 86. Thus a plurality of first attachment members 83 are provided, permitting the two carrier halves 72, 74 to be bolted or otherwise fastened to the central carrier support torque frame 76.

Figure 10:
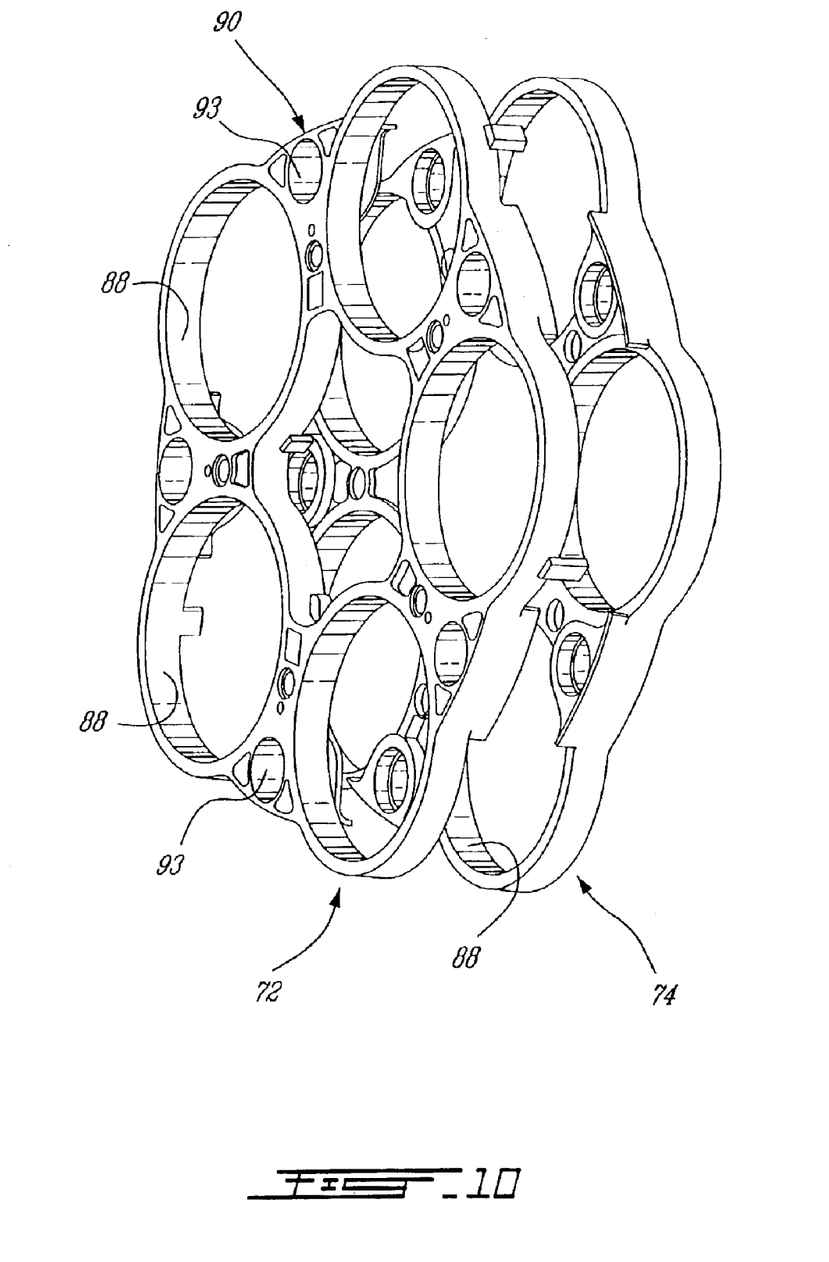
FIG. 10 shows a perspective view of both halves of the split gear carrier of FIG. 8.

Referring to FIG. 10 showing the split gear carrier halves 72, 74 in more detail, the downstream first carrier half 72 and the upstream second carrier half 74 each have a corresponding plurality of gear support bores 88, within which roller bearings 92 (as seen in FIG. 8) that support the axles of the star gears 75 are preferably disposed. Between each star gear mounting bore 88 is an attachment member 90 which comprises a bore or sleeve 93 corresponding to the sleeves 86 of the annular carrier support torque frame 76, such that the first gear carrier half 72 and the second gear carrier half 74 can be engaged together by bolts 94 (see FIG. 8) extending completely therethrough. Preferably, the two carrier halves 72,74 are fastened onto either side of the first attachment members 83 of the central support torque frame 76 by the hollow bolts 94, disposed through the bores 93 of the circumferential spaced attachment members 90.

Each of the gear support bores 88, within the first and second carrier halves 72 and 74, preferably receives a roller bearing 92, as shown in FIG. 7, for supporting an opposing axle end of each star gear 75. Although the use of journal bearings is equivalently possible, roller bearings are preferred as they generally provide improved reliability. The term gear "axles" as used herein is intended to include both integrally-formed and independent axle elements.

This star carrier assembly 70 is similar to the carrier assembly 40 according to the first embodiment of the present invention, in that torsional deflection of the carrier is substantially reduced as a result of the attachments of the fixed support torque frame 76 with the carrier halves 72, 74 very close to the plane of action of the resultant gear forces of the star gear train. However, the star carrier assembly 70 provides a more lightweight assembly compared to prior art such as U.S. Pat. No. 5,466,198 (McKibbin et al). The lightweight structure is possible largely as a result of the carrier support torque frame 76 being engaged between the carrier halves 72, 74 rather than at the back of the down stream half, as in U.S. Pat. No. 5,466,198. The distance between the mounting plane and the plane of action is thereby greatly reduced. Thus, the location of the annular mounting plane of the carrier support torque frame 76 with the outer housing 71, very close to the plane of action of the resultant gear forces at the midsection of the gear train, significantly reduces bending and twisting of the spoke-like webs 82, to which the split carrier halves 72, 74 are fastened, permitting a light carrier assembly structure. The carrier halves 72, 74, with bearing outer-rings having gear mounting bores 88 and retaining bolts 94, form a more rigid box structure that twists and warps much less than the spokes of the torque frame, thereby reducing the misalignment of the star gear axle and its effects on the operation of gears and bearings. Additionally, the splined joint between the support torque frame 76 and the outer gearbox housing 71 eliminates the need for traditionally used fitted bolts or dowel pins, which are commonly subject to fretting (especially in light alloy housings) and add to the overall weight of the assembly. U.S. Pat. No. 5,466,198 also includes a torque frame and two carrier halves. However, the carrier support is mounted about 3.5 times farther from the load plane, requiring a fairly robust, and consequently rather heavy, structure. The side by side carrier and carrier support arrangement is much disadvantaged to the present invention, in which the carrier support is sandwiched between the two carrier halves.

As mentioned above, the embodiment of FIGS. 7–10 is particularly adapted for use in a geared turbofan engine. Referring again to FIGS. 7 and 8, when the carrier assembly 70 is employed in a single stage epicyclic gear set of a geared fan engine, the engine output shaft 85 can be driven directly by the low pressure turbine, and the ring gear coupling 89 engages a downstream fan output shaft. Such a single stage epicyclic gear set meets the low transmission ratio and relatively high power requirements necessary for such an application.

The embodiments of the invention described above are intended to be exemplary only. For example, in the preferred embodiments three planet and five star gears are used, however a different plurality of planet gears can be employed. Additionally, the torque transfer assembly can also be applicable in a single or a multiple reduction stage gearbox or gear train. One skilled in the art will appreciate that the present invention also has application well beyond the gas turbine engine examples described. The scope of the invention is therefore intended to be limited solely by the scope of the appended claims.

What is claimed is:

1. An epicyclic carrier assembly adapted for use in an epicyclic gear train, said gear train including a sun gear rotatable about a central axis, a concentric outer ring gear, and a plurality of gears circumferentially spaced relative to, and mechanically intermediate of, said sun gear and said ring gear and in meshing engagement therewith, said plurality of gears being adapted for receiving torque input from said sun gear, said planetary carrier assembly comprising:

a split gear carrier, comprising a first half and a second half for rotatably supporting respective first and second ends of a plurality of axles of said plurality of gears, said plurality of axles being parallel to said central axis, said plurality of gears being circumferentially located about said central axis and axially disposed between said first and second halves of said split gear carrier, each of said first and second halves having a corresponding first attachment member; and a carrier support torque frame disposed concentrically with said central axis and axially located between said first half and said second half of said split gear carrier, said carrier support torque frame having an annular mounting flange adapted for fixed engagement with an outer housing and comprising a second attachment member, said second attachment member being mounted to said first attachment members to structurally connect said first and second halves of said split gear carrier to said carrier support torque frame, said first and second attachment members being mounted to one another in a plane between said first and second ends of said plurality of axles of said plurality of gears.

2. The epicyclic carrier assembly as defined in claim 1, wherein said epicyclic gear train is a star gear set, and said epicyclic carrier assembly is a star carrier assembly and said plurality of gears are star gears.

3. The epicyclic carrier assembly as defined in claim 1, wherein said outer ring gear is rotatable about said central axis and is adapted for providing torque output from said plurality of gears, said epicyclic carrier assembly being rotatably fixed.

4. An epicyclic carrier assembly adapted for use in an epicyclic gear train, said epicyclic gear train including a sun gear rotatable about a central axis, a concentric outer ring gear, and a plurality of gears circumferentially spaced relative to, and mechanically intermediate of, said sun gear and said ring gear and in meshing engagement therewith, said plurality of gears being adapted for receiving torque input from said sun gear, said epicyclic carrier assembly comprising:

a gear support member, concentric with said central axis, and adapted to rotatably support said plurality of gears on a plurality of axles between first and second axle ends, said plurality of axles being parallel to said central axis, said plurality of gears being circumferentially located on said gear support member about said central axis, said gear support member having at least a first connecting member; and a coupling adapter disposed concentrically with said gear support member, said coupling adapter having a second connecting member, said second connecting member being engaged with said first connecting member to structurally join said coupling adapter and said gear support member, said first and second connecting members being mounted to one another in a plane between said first and second axle ends.

5. The epicyclic carrier assembly as defined in claim 4, wherein said gear support member is rotatable about said central axis and said outer ring gear is fixed relative to a surrounding housing.

6. The epicyclic carrier assembly as defined in claim 5, wherein said coupling adapter comprises a torque transfer member that is rotatable with the gear support member and includes a central torque output element comprising a splined portion, said splined portion being adapted for engagement with a driven output.

7. The epicyclic carrier assembly as defined in claim 6, wherein said epicyclic gear train is a planetary gear set, said gear support member is a planetary carrier and said plurality of gears are planet gears.

8. The epicyclic carrier assembly as defined in claim 6, wherein said driven output is a propeller shaft.

9. The epicyclic carrier assembly as defined in claim 4, wherein said outer ring gear is rotatable about said central axis and provides torque output from said plurality of gears, said coupling adapter being fixed relative to a surrounding housing.

10. The epicyclic carrier assembly as defined in claim 9, wherein said coupling adapter is an annular support flange having a splined portion on an outer diameter thereof, said splined portion being adapted for fixed engagement with said surrounding housing.

11. The epicyclic carrier assembly as defined in claim 9, wherein said epicyclic gear train is a star gear set, and said epicyclic carrier assembly is a star carrier assembly and said plurality of gears are star gears.

* * * * *